United States Patent
Gupta et al.

(10) Patent No.: US 10,740,925 B2
(45) Date of Patent: Aug. 11, 2020

(54) OBJECT TRACKING VERIFICATION IN DIGITAL VIDEO

(71) Applicant: Adobe Inc., San Jose, CA (US)

(72) Inventors: Angad Kumar Gupta, Ghaziabad (IN); Abhishek Shah, Delhi (IN)

(73) Assignee: Adobe Inc., San Jose, CA (US)

( * ) Notice: Subject to any disclaimer, the term of this patent is extended or adjusted under 35 U.S.C. 154(b) by 121 days.

(21) Appl. No.: 16/115,994

(22) Filed: Aug. 29, 2018

(65) Prior Publication Data

US 2020/0074673 A1 Mar. 5, 2020

(51) Int. Cl.
| | |
|---|---|
| *G06T 7/73* | (2017.01) |
| *G06K 9/00* | (2006.01) |
| *G06T 7/13* | (2017.01) |
| *G06K 9/62* | (2006.01) |

(52) U.S. Cl.
CPC ............ *G06T 7/74* (2017.01); *G06K 9/00228* (2013.01); *G06K 9/6256* (2013.01); *G06T 7/13* (2017.01); *G06T 2207/10016* (2013.01)

(58) Field of Classification Search
CPC .................... G06T 7/74; G06T 7/13
See application file for complete search history.

(56) References Cited

U.S. PATENT DOCUMENTS

| | | | |
|---|---|---|---|
| 2016/0057508 A1* | 2/2016 | Borcherdt | H04N 21/2353 715/719 |
| 2018/0137632 A1* | 5/2018 | Takada | G06K 9/00261 |

OTHER PUBLICATIONS

"Boris FX | Mocha", Retrieved at: https://borisfx.com/products/mocha/—on Apr. 26, 2018, 13 pages.
"Tracking and stabilization motion workflows in After Effects", Retrieved at: https://helpx.adobe.com/after-effects/using/tracking-stabilizing-motion-cs5.html—on Apr. 26, 2018, 35 pages.
"YOLO: Real-Time Object Detection", Retrieved at: https://pjreddie.com/darknet/yolo/—on Mar. 29, 2018, 5 pages.

* cited by examiner

*Primary Examiner* — Tuan H Nguyen
(74) *Attorney, Agent, or Firm* — SBMC

(57) ABSTRACT

Object tracking verification techniques are described as implemented by a computing device. In one example, feature points are selected on and along a boundary of an object to be tracked, e.g., in an initial frame of a digital video, which are referred to as "feature points." Tracking of the feature points is verified by the computing device between frames. If the feature points have been found to deviate from the object, the feature points are reselected. To verify the feature points, a number of tracked features points in a subsequent frame is compared to a number of feature points used to initiate tracking with respect to a threshold. Based on this comparison, if a number of feature points is "lost" in the subsequent frame that is greater than the threshold, the feature points are reselected for tracking the object in subsequent frames of the video.

20 Claims, 9 Drawing Sheets

OBJECT TRACKING VERIFICATION IN DIGITAL VIDEO

BACKGROUND

Object tracking, a feature commonly used in digital video workflows and applications, allows for tracking motion of an object between frames of a digital video. Object tracking may support a variety of functionality including censoring of faces, redaction of personal information, the application of overlays and clip art, and so on. To do so in conventional techniques, a boundary of the object is first defined, manually, that is then used as a basis to track motion of the object between the frames of the digital video. A user, for instance, may manually create an object mask by selecting points on various edges, contours and surfaces of the object in a frame of the digital video. Such selected points are referred to as "feature points." Depending on the complexity of the object, definition of the feature points using conventional manual techniques may involve substantial effort and time and is prone to error. This may be especially true when the object intended to be tracked has a non-trivial shape, e.g., having a high number of complex and intricate edges.

Conventional techniques that rely on the selection and tracking of feature points, as described above, face numerous challenges that may result in inaccurate and untimely object tracking. Feature points, for instance, may deviate from and become disassociated with the object during movement between frames. This deviation causes the feature points to no longer coincide with contours and edges of the object. Feature point deviation may occur due to a variety of reasons, such as when the tracked object moves too rapidly for the tracking algorithm to keep pace with the tracked object, when background also changes along with foreground content, or during excessive camera shaking.

Other example conditions causing feature point deviation may be caused due to the similarity of coloration of the tracked object relative to the background, error buildup in applied tracking algorithms, or when the tracking algorithms are not capable of learning for the purposes of self-adjustment. For example, conventional tracking algorithms may fail to account for parameters specific to the object, and thus simply rely on object color and shape, which may cause these techniques to fail due to difficulties in differentiating the object from the background. Accordingly, conventional object tracking techniques require significant amounts of user interaction, the results of which may fail over time, and as such are both inefficient with respect to user interaction as well to resources of a computing device that employs these conventional techniques.

SUMMARY

Object tracking verification techniques are described as implemented by a computing device. These techniques overcome the challenges of conventional techniques and thus improve both user efficiency and operational efficiency of a computing device. In one example, feature points are selected on and along a boundary of an object to be tracked, e.g., in an initial frame of a digital video. This may be performed manually by a user or automatically by an object tracking system, e.g., using machine learning. The features points are then used to track motion of the object between frames of a digital video, which is used to detect movement of the object.

Tracking of the feature points is verified by the object tracking system between frames. If the feature points have been found to deviate from the object, the feature points are reselected. To verify the feature points, a number of tracked feature points in a subsequent frame is compared by the object tracking system to a number of feature points used to initiate tracking with respect to a threshold. Based on this comparison, if a number of feature points that is "lost" in the subsequent frame is greater than the threshold, the feature points are reselected automatically and without user intervention by the object tracking system for tracking the object in subsequent frames of the digital video, e.g., using machine learning. In this way, the object tracking system may overcome the challenges of conventional techniques and improve user and computer operational efficiency.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
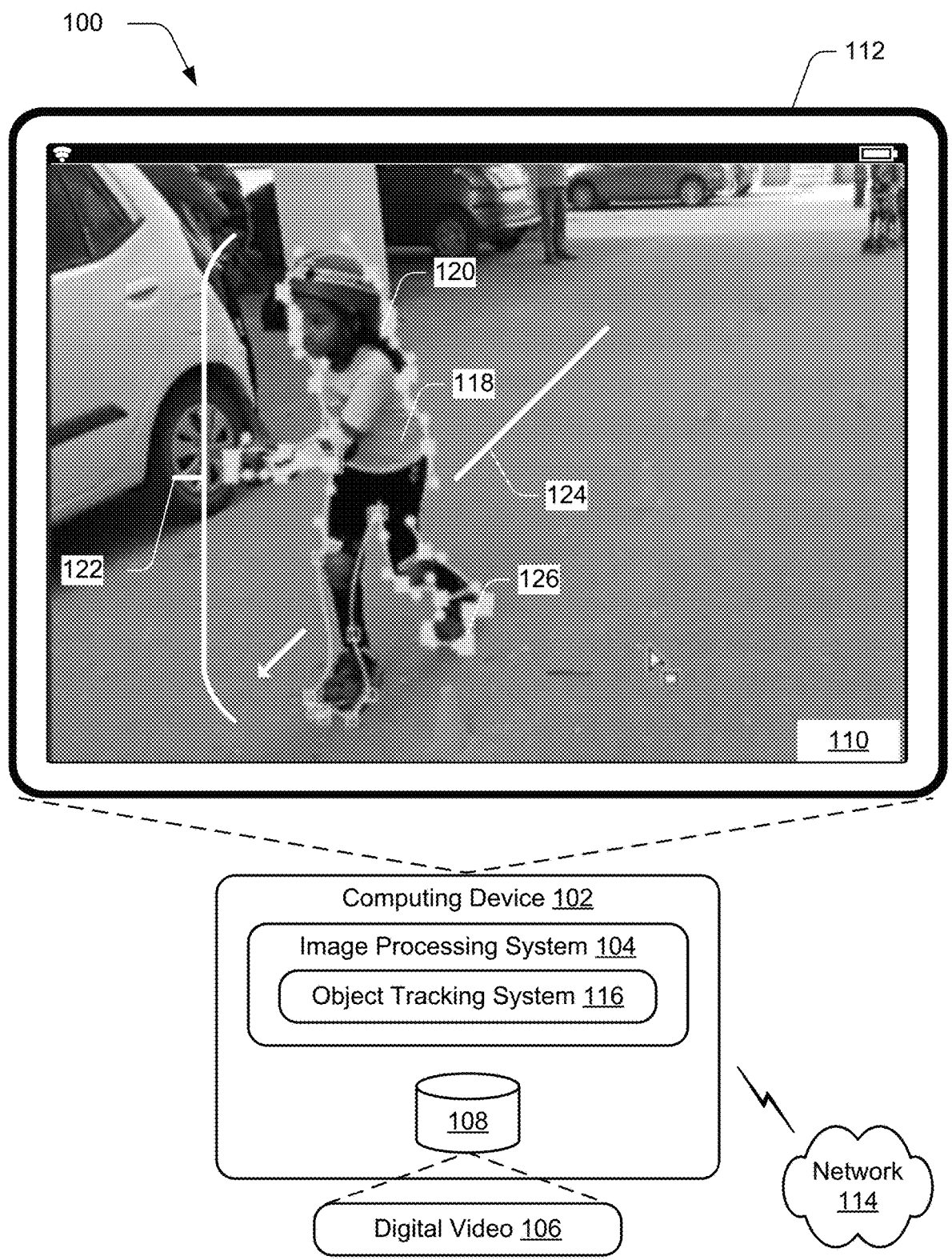
FIG. 1 is an illustration of an environment in an example implementation that is operable to employ object tracking and verification techniques in a digital video.

Conventional techniques used by a computing device to track a moving object in digital video are confronted with a variety of challenges that may result in inaccurate and untimely object tracking. Conventional object tracking techniques, for instance, often rely on the manual placement and retention of points selected or defined on contours or edges of an object to track the object through frames in a digital video. Such points are referred to as "feature points," and are typically set on the object at an initial frame. During tracking, the feature points typically deviate (e.g., "drift away") from their original positions on contours or edges of the tracked object over time as the object moves in subsequent frames of the video.

The feature points, for instance, may drift away from a boundary of the object as the object moves from one region of the initial frame to other regions in later frames. This drift prevents accurate object tracking and thus interferes with video editing efforts that rely on this functionality to realistically edit frames of the digital video. Examples of such functionality include censoring of faces or other sensitive imagery such as personal or confidential information, applying overlays and clip art, determining movement of the tracked object, and so forth.

One conventional example used to address these challenges involves use of a planar-tracking image engine. In contrast to tracking based on feature points as described above, planar-tracking image engines search for user-defined planes to create a shape, referred to as an "object mask," around the contours of the object intended for tracking. Further, planar-tracking may place "X"-shaped splines, e.g., visual representations of functions used for interpolation or smoothing, on the contours of the object to allow for later readjustment of the object mask.

However, conventional planar-tracking engines also require users to manually readjust the object mask in response to drift of the mask away from the tracked object over time, which is also manually detected by the user. This is performed so that the planar-tracking engines can combine tracking data with the readjusted object mask data to provide improved tracking results. Thus, usage of planar-tracking engines, although providing better results than reliance on traditional feature points alone, still require substantial user involvement and manual effort to obtain desired tracking results. Therefore, such usage is time-consuming and also prone to user-error.

Challenges of conventional object tracking solutions include that: (1) initial selection of the object to be tracked is time-consuming; and, (2) feature points typically deviate (e.g., drift away) from the object to be tracked over time. Regarding the first challenge, object tracking begins by defining an object mask around the object to be tracked. In conventional techniques, users are relied upon to manually define the object mask by selecting individual feature points on contours and edges of the object, where lines connect the feature points around the object to create the object mask. Depending on the complexity of the object, this process may require significant manual effort, especially in circumstances where the object is non-trivial and has a variety of complex edges and intricate contours.

Regarding the second challenge, feature points typically deviate from the object through successive frames of the digital video over time. This may be encountered in a variety of scenarios. In one scenario, rapid movement of the object prevents conventional tracking techniques from adequately keeping pace with the object. In another scenario, background scenery changes along with foreground content preventing differentiation between the object with the background. Additionally, excessive camera movement, such as shaking, interferes with accurate retention of the feature points on the object as it moves between frames. Color mixing of objects with colors of the background may also cause a feature point deviation. Further, accumulation of error in object tracking algorithms may also cause these conventional techniques to fail over time as the feature points may drift further and further away from the object in successive frames.

Tracking algorithms may also fail to recognize and process visual semantics of the object, i.e., whether the object is a dog, a face of a person, a cap, and only relies on color and shape of the object for matching in frames subsequent to an initial object definition frame. Any one or more of the above identified example scenarios, among others, can cause the object mask to deviate from an actual position of the object in a frame of a digital video. As a result, conventional techniques require users to manually observe these deviations and then also manually readjust the feature points that have drifted away from the object to realign the object mask with the object prior. The user is also tasked to again activate object tracking in the digital video, which is time and resource intensive as this process is typically repeated over and over in conventional techniques.

Accordingly, object tracking techniques are described that are usable to automatically select, track, and verify tracking of an object without manual user intervention in an improved and efficient manner over conventional techniques. Such selection may, involve the iterative selection and reselection of feature points upon a defined interval of frames. In one example, machine learning techniques are employed by an object tracking system. The machine learning techniques are used to select, e.g. generate, an initial selection of feature points automatically and without user intervention on contours, edges, and boundaries on the object to be tracked to create an object mask. The techniques also use verification techniques to implement fault-tolerance related functionality. Fault-tolerance is defined in a digital video editing context as a property that enables continued operation of a solution in the event of the failure in some of its capabilities. The ability to maintain at least some functionality when portions of the solution degrade is referred to as gradual, or graceful, degradation.

Here, deviation of feature points from the tracked object over time may be such a gradual degradation, or partial failure, of the object tracking. Rather than causing the techniques to cease operation entirely as required in conventional techniques, fault-tolerance functionality allows the techniques to automatically identify and correct for detected deviation of feature points from their original positions. To do so, the techniques select, locate, verify, and reselect feature points to maintain the object mask around the object during movement of the object. This is performed in real time (e.g., on a frame-by-frame basis, or across some other defined interval of frames) to ensure that the object mask remains firmly adhered to the object during movement through frames of the digital video, allowing for accurate and timely object tracking.

Deviation of the tracked feature points may be determined by the object tracking system in a variety of ways. In one example, a number of feature points initially selected to track the object is compared to a number of tracked feature points for a later frame of the digital video be analyzed, i.e., to track the object, with respect to a threshold. If the number of tracked features points, for instance, deviates from the number of feature points initially selected to track the object (e.g., is greater than an amount specified by the threshold), the object tracking system detects deviation in the tracking of the object. This causes the object tracking system to reselect feature points to be used for subsequent tracking of the object through later frames of the digital video. In this way, the object tracking system may detect this deviation and respond accordingly to maintain ongoing object tracking accuracy.

Thus, the discussed object tracking system overcomes the challenges of conventional techniques in that: (1) feature points may be automatically selected without manual user intervention in the initial frame, and (2) verification and reselection of the feature points retains the object mask around the object during movement of the object between frames automatically and without user intervention. This permits for ongoing object tracking accuracy, with the minimization of errors due to feature point deviation. Accordingly, the tedious and repetitive selection of feature points to define a shape, such as an object mask, around the object to be tracked in the initial frame as needed in conventional techniques, may be avoided. As a result, the object tracking system enhances both object tracking efficiency and accuracy.

Further, setting and maintaining the object mask as adhered on the moving object across multiple frames of the digital video permits the techniques to identify a work path of the object mask. This work path defines a general path of movement of the object from one region in, for example, an initial frame, to another region in subsequent frames and as such works to further verify tracking of the object. Use of the work path by the object tracking system allows improvement of object tracking accuracy and provides yet another degree of video editing freedom and functionality.

Techniques are also described to calculate parameters and tags specific to the object to be tracked. In this regard, multiple objects may be simultaneously tracked in the digital video by applying object-specific tags to each of the objects. For example, each object may receive a tag or identifier specific to that object to create a tagged object. This tagged object is differentiated from other non-tracked or tracked objects according to the tag of the tagged object. Likewise, enhanced object detection and tracking is possible through implementation of parameters calculated for specific objects. For example, certain objects are identified using color, and, for example, facial recognition (if the object is human) technology.

Further, techniques calculate and employ visual representation of an encompassing rectangular function or region, referred to herein as a "rect," over sections of the frame where the object to be tracked resides. In instances where multiple objects are tracked, multiple rects may be selected, e.g., generated. Each rect corresponds with the location of a particular object to be tracked. Establishment of the one or more rects as described facilitates the efficient automatic tagging of objects residing within their respective rects, further streamlining and enhancing the accuracy and reliability of the techniques.

Moreover, techniques may iterate, on a frame-by-frame basis, to determine and continually compare the number of feature points adhered onto the tracked objects across various frames. Such determinations are used to determine when and where select new feature points to maintain the positional accuracy of the object mask as adhered onto the object during movement of the object. Specifically, an initial count of the number of feature points is used to define the object mask around the object. This initial count is subtracted from a count of feature points remaining adhered to the object at a frame after to the initial frame to determine a count of lost, or misplaced, feature points that have drifted away from the object. This count of lost feature points is compared against a threshold value, where exceeding the threshold value triggers the selection of new feature points on the object. The selection of new feature points provides for the continual retention of the object mask on the object during movement of the object, allowing for accurate motion tracking of the object.

The techniques, and the various aspects of individual techniques described above, are interchangeable and may communicate or function with any one or more of the described techniques. For instance, the described feature point selection capabilities may complement identification of the work path. And, the feature point reselection capabilities and the identification of the work path may function with the discussed multiple object tagging capabilities within a given frame, or sequence of frames, in a digital video. Thus, the techniques collectively provide an accurate, thorough and powerful approach to seamless object tracking in digital video, while requiring minimal ongoing user intervention.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation. The environment 100 is operable to employ object tracking techniques described herein, and includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including an image processing system 104, which is implemented at least partially in hardware of the computing device 102. The image processing system 104 processes a digital video 106, which is illustrated as being stored in a storage device 108 of the computing device 102. Processing of the digital video 106 refers to the object editing as well as the rendering of the digital video 106 in a user interface for output, e.g., as an initial frame 110 of the digital video 106 by a display device 112. Although illustrated as implemented locally at the computing device 102, functionality of the image processing system 104 may also extend in whole or part to functionality available for implementation via a network 114, such as part of a web service or "in the cloud."

An example of functionality incorporated by the image processing system 104 (e.g., to process the digital video 106) is illustrated as an object tracking system 116, which includes machine-learning based capabilities to track the object 118 through frames of the digital video 106. Machine learning, as referred to herein, relates to data analysis techniques that automate analytical model building, e.g., systems that can learn from data, identify patterns, and make decisions with limited to no human intervention.

The object tracking system 116 implements machine learning functionality to receive, as an input, an initial frame 110 including the object 118 for tracking. From receipt of the initial frame 110, the object tracking system 116 selects feature points 120 on surfaces, edges, boundaries, and contours (referred to collectively herein as "edge surfaces 126") of the object 118 to extract an object mask 122 of the object 118. The object tracking system 116 then tracks the feature points 120 and the object mask 122 in frames subsequent to the initial frame 110 in the digital video 106. To do so, the object tracking system 116 automatically reselects the feature points 120 on the edge surfaces 126 of the object 118 in frames subsequent to the initial frame 110.

In detail, the feature points 120 are reselected on the edge surfaces 126 in a current frame upon verifying that a number of the feature points 120 have been "lost," e.g., compared to the initial frame 110, or any frame earlier than the current frame, due to deviation of the feature points 120 from the position of the object 118 at the current frame. This deviation, also referred to as "drifting away" of feature points, may result from limitations in computer capability and processing power. Thus, the object tracking system 116 anticipates and corrects for such deviation to reselect feature points 120 that have drifted away from the object. As a result, the object mask 122, defined by the ongoing reselection of the feature points 120, remains tightly bound to the edge surfaces 126 of the object 118 to thus allow for accurate tracking of the object 118 throughout the digital video 106.

Further, the object tracking system 116 relies on the automatic selection and reselection of the feature points 120 to define a work path 124 that indicates motion of the object 118 in the digital video 106. The work path 124 is shown in FIG. 1 as being mostly linear; however, other types of work paths 124 may exist, e.g., curvilinear, curved, zig-zag, and random, and may be useful to assess an intended path of travel of the object 118 in the digital video 106.

Figure 8:
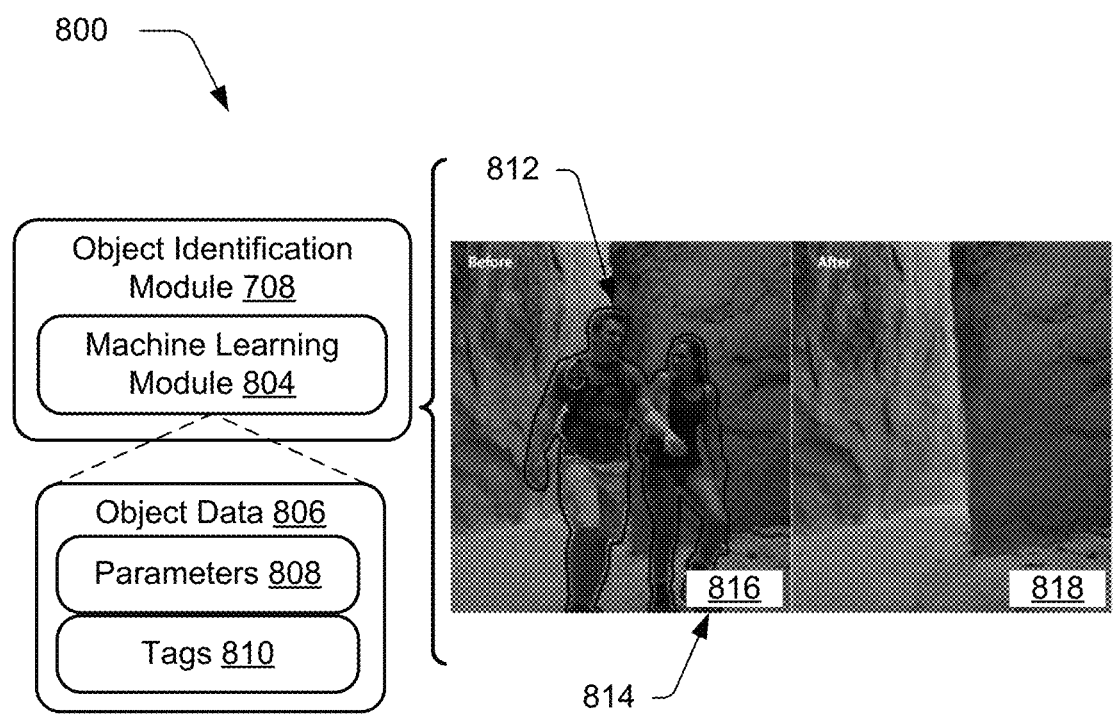
FIG. 8 depicts an example system for applying tags to differentiate between objects intended to be tracked in a digital video.

Further, the object tracking system 116 may attach parameters and tags, e.g., as shown in FIG. 8, onto one or more objects in at least the initial frame 110. Such parameters and tags may be used to differentiate between the objects for tracking of multiple objects in the digital video 106. For example, a scene in the digital video 106 for editing with the object tracking system 116 may show a couple, e.g., a man and a woman, who are walking a dog in a park. The woman is holding a leash to retain the dog. Attachment of object-specific tags to the man, the woman, and the dog, respectively, allows for tracking of each person and animal separately, and allows for separate and distinct image editing. For example, the man may be edited out of the scene, allowing for only the woman to be shown walking the dog.

The following discussion begins with an example of conventional object tracking techniques that experience feature point deviation over time, e.g., such that feature points drift away from the object in frames subsequent to an initial selection frame. Automatic selection of the feature points 120 in the initial frame 110, and reselection of the feature points 120 in later frames, is then described in detail. Such description also provides for the establishment of the work path 124, as well as multiple object tagging and differentiation between the objects based on their respective tags in the digital video 106.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Feature Point Deviation

Figure 2:
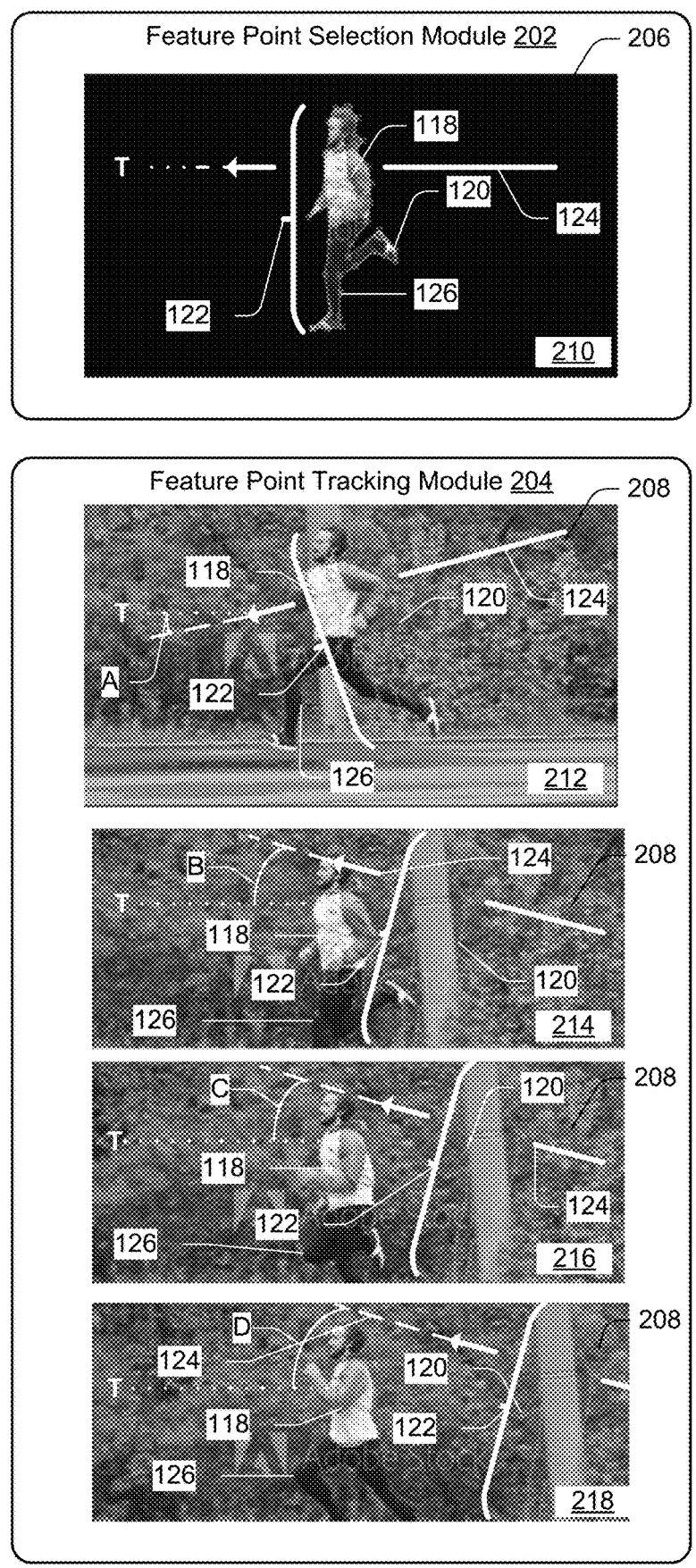
FIG. 2 depicts challenges found in tracking an object using conventional methods.

Deviation of feature points, as found in conventional object tracking techniques, is shown by example 200 of FIG. 2. As discussed earlier with respect to FIG. 1, such deviation may result from computer processing limitations. In contrast to conventional techniques, the object tracking system 116 addresses such deviation of feature points by automatically reselecting the feature points 120 to accurately track the object 118 in the digital video 106.

In example 200, an initial frame 210 includes the object 118 centered therein. The background is digitally removed to show selection of the feature points 120 on the edge surfaces 126 of the object 118. Collectively, the feature points 120, and connections or connection lines between each feature point of the feature points 120, define the object mask 122, which is formed tightly on the edge surfaces 126 of the object mask 122. Conventional techniques may require user intervention to individually select the feature points 120, a process which is labor-intensive and error-prone. Once selected, the feature points 120 define the object mask 122 which is oriented to face a hypothetical target "T." Movement of the object 118, e.g., as defined by the object mask 122, indicates the work path 124 toward the target T.

Movement of the object 118 toward the target T in frames 212-218 after the initial frame 210 results in the gradual deviation, or the drifting, of the feature points 120 away from the object 118. As shown in frames 212-218, the object mask 122, defined by the feature points 120, drifts in a direction generally opposite to the direction of movement of the object 118. That is, movement of the object 118 towards the left side of the frames 212-218 produces a corresponding deviation of the object mask 122 toward the right side of the frames 212-218. Also, the pace, direction, and adherence of the object mask 122 to the edge surfaces 126 the object 118 all may vary while deviating from the object 118.

Factors potentially contributing toward and influencing the path of deviation of the feature points 120 include the speed or velocity of the object 118 moving toward the target T. Also, the ability of the camera to continue panning to capture the object 118 steadily throughout progressive frames (e.g., minimization of camera shake or "jitter" to maintain focus on the object 118) is a factor that may influence drift behavior of the feature points 120 and their corresponding object mask 122.

Initial deviation of the feature points 120, and the object mask 122 defined thereby, is shown in frame 212. As shown, the object mask 122 is slightly off-position from the object 118 in frame 212, but continues to keep its original outline or shape as shown earlier in the initial frame 210. Thus, in the example 200, the object mask 122 is shown drifting away from the object 118 while keeping its originally-defined shape from the initial frame 210. However, other forms and variations of deviation of the feature points 120 may exist, with the object mask 122 changing in shape between that originally defined in the initial frame 210, and that shown in a current frame.

Such deviation of the object mask 122 away from the object 118 as shown in the frame 212 is undesirable and contributes to inaccuracies in tracking the object 118. For example, deviation of the object mask 122 as shown in the frame 212 results in conventional techniques reporting erroneous positional results for the object 118. This prevents the accurate and precise ongoing tracking of the object 118 in frames subsequent to the initial frame 210. Users, for example, seeking to delete or relocate the object 118 in the digital video 106 using conventional techniques may thus experience difficulty. This is due to inaccurate positional data of the object 118 as caused by of deviation of the feature points 120.

Further, such deviation of the feature points 120 and the object mask 122 as described above prevents the work path 124 from correctly leading to the target T as shown in the initial frame 210. For instance, depending on a particular angle of deviation from the originally-defined work path 124 in the initial frame 210, the work path 124 may point to an entirely different region than that originally intended in subsequent frame 212-218. Such a separation is shown by angle "A" the frame 212. This angle may change in relation to the direction, position, and angle of deviation of the object mask 122, which may drift irregularly in the subsequent frames 214-218 relative to the subsequent frame 212 for any of the influencing factors presented earlier, e.g., the bouncing up and down of the runner (object 118) while he runs.

Thus, although first pointing beneath the target T, the work paths 124 shown in the subsequent frames 214-218 may point above the target T, being defined by angles B, C, and D, respectively. Such angles B, C, and D, may become larger with time as the deviation of object mask 122 becomes more substantial relative to the object 118 in frames subsequent to the initial frame 210.

Such positional inaccuracy of the object mask 122 relative to the object 118 is undesirable from a video editing perspective. Conventional techniques, which rely primarily on manual feature point selection and setting, followed by tracking those feature points in subsequent frames, may tend to produce such positional inaccuracies due to limitations in computer processing power. Further, conventional techniques rely on user interaction to detect this deviation, manually, which is frustrating and computationally inefficient.

In contrast, the techniques described herein for the object tracking system 116 address the challenges faced by conventional techniques regarding feature point deviation by employing feature point verification and reselection capabilities that may be performed automatically and without user intervention. Such capabilities rely on detection of feature point deviation to keep the object mask 122 tightly adhered onto the object 118 upon movement of the object 118 in frames subsequent to the initial frame 210.

Object Tracking System and Feature Point Verification

Figure 3:
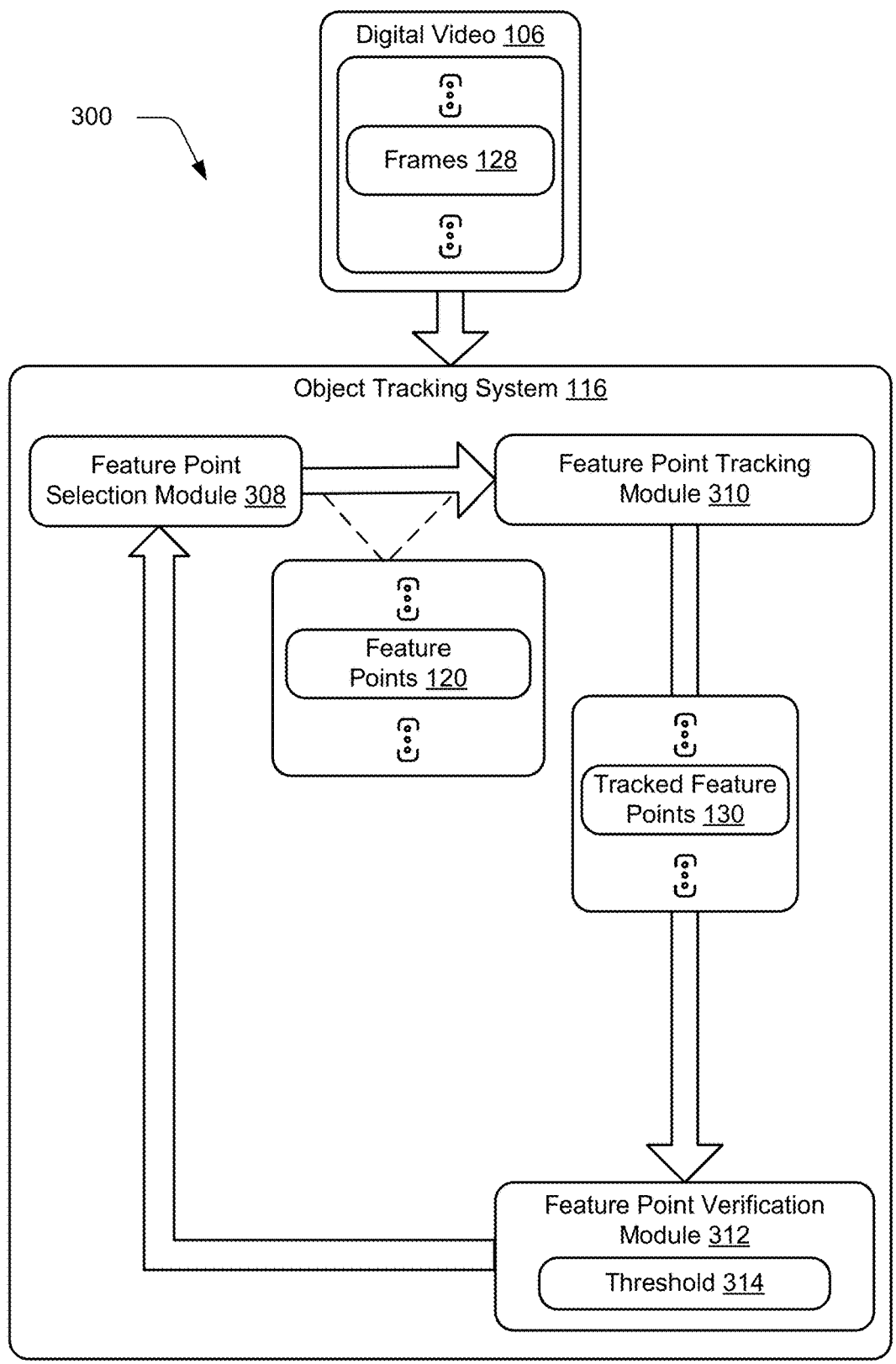
FIG. 3 depicts an example system to select, track, and verify whether feature points have deviated relative to a threshold in an object tracking system.
Figure 4:
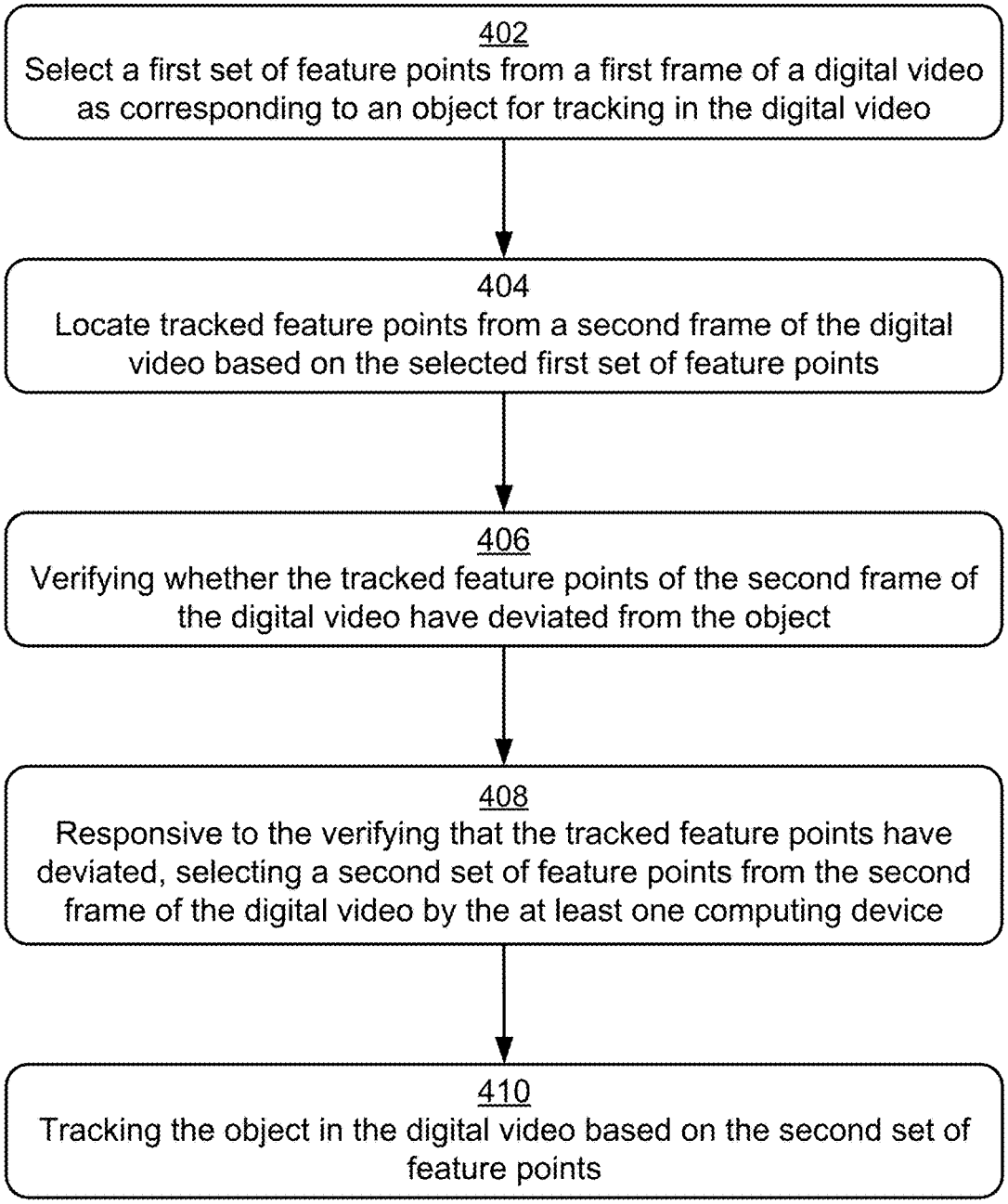
FIG. 4 is a flow diagram depicting a procedure in an example implementation in which the deviation of tracked feature points is verified to select a second set of feature points.

FIGS. 3 and 4 depict examples 300, 400 of implementations of the object tracking system 116 to correct for feature point deviation to accurately track the object 118 in the digital video 106. Such tracking may be desirable for a variety of digital video editing purposes, such as for the removal, transition, placement, manipulation, or other editing of the object 118. For instance, in the example shown in FIG. 1, the object 118 is shown as a young girl roller-skating in a parking lot. The object tracking system 116 allows for the redirection of the work path 124, shown in FIG. 1, to a different destination. Alternatively, the girl may be edited out of the scene entirely to focus on the static background, or to introduce a new and different object to the scene. Thus, as discussed, the variations and possibilities of potential uses of the object tracking 116 are many, to thus provide a powerful and complete digital video editing tool.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 1-8.

To accurately track object 118 in the digital video 106, the object tracking system 116, e.g., as shown in FIG. 3, corrects for potential deviation of the feature points 120 through use of several distinct, but interrelated modules. For instance, the object tracking system 116 receives the initial, e.g., first, frame 110, as well as several frames 128 subsequent to the initial frame 110 of the digital video 106. Next, a feature point selection module 308 selects the feature points 120 on the object 118 in the initial frame 110 of the digital video 106.

Following the selection of the feature points 120 at the initial frame 110, the other modules, e.g., feature point tracking and verification modules 310 and 312, respectively, are used to locate and verify whether tracked feature points 130 of the feature points 120 are present at a current frame relative to a threshold 314. Should the tracked feature points 130 fall beneath the threshold 314, e.g., due to a number of the feature points 120 being "lost" due to deviation, the feature point verification module 312 communicates with the feature point selection module 308 to reselect the feature points 120 on the edge surfaces 126 of the object 118. Such reselection of the feature points 120 accurately tracks movement of the object 118 throughout subsequent frames of the digital video. In this way, motion of the object 118 may be tracked automatically and without user intervention through the frames 128 of the digital video 106.

In one example, the feature point selection module 308 selects a first set of feature points from a first frame of the digital video 106 (block 402). The selected feature points correspond to the object 118 for tracking in the digital video 106.

Figure 5:
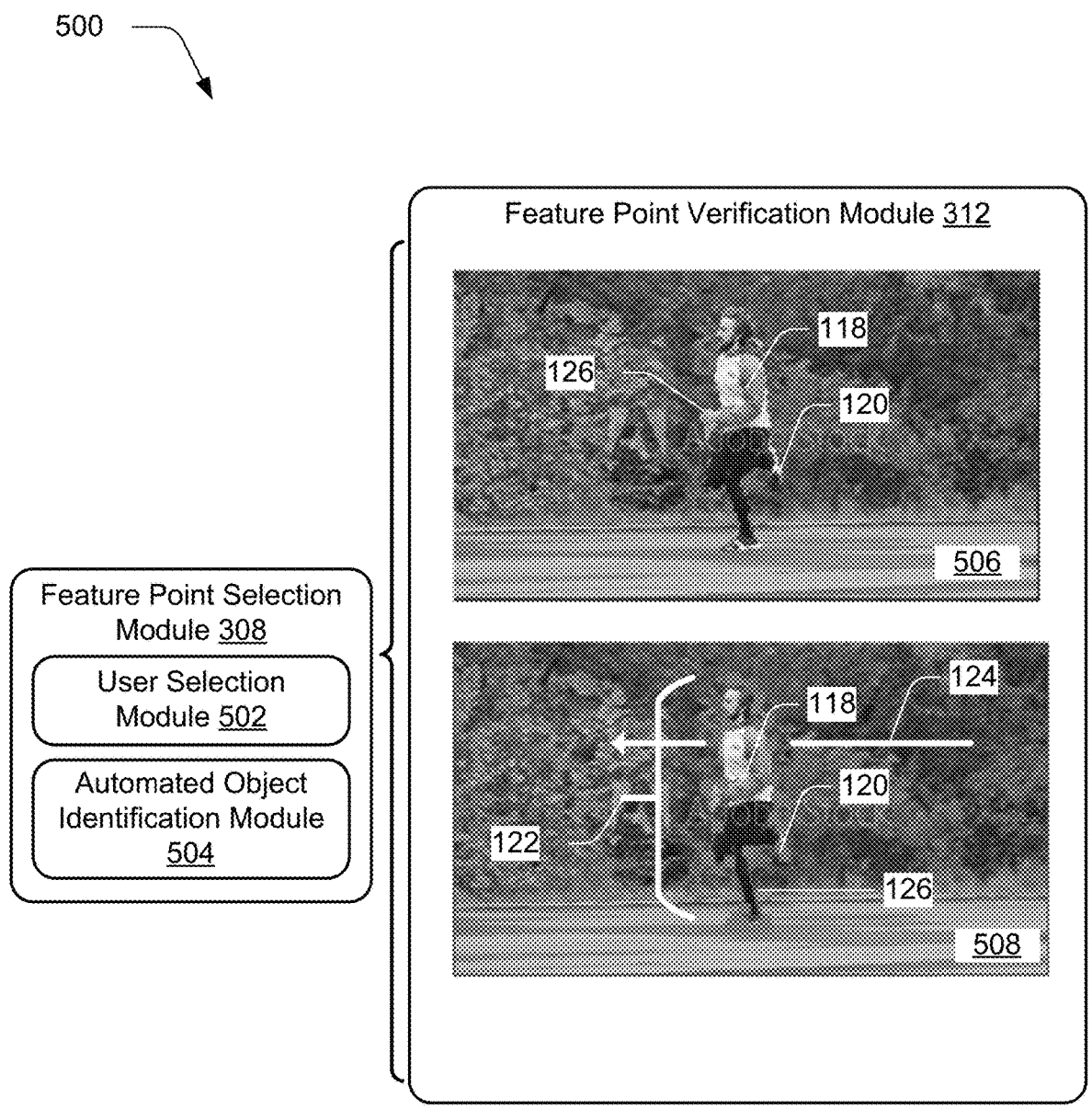
FIG. 5 depicts a system in an example implementation showing the operation of feature point selection and verification modules in greater detail.
Figure 6:
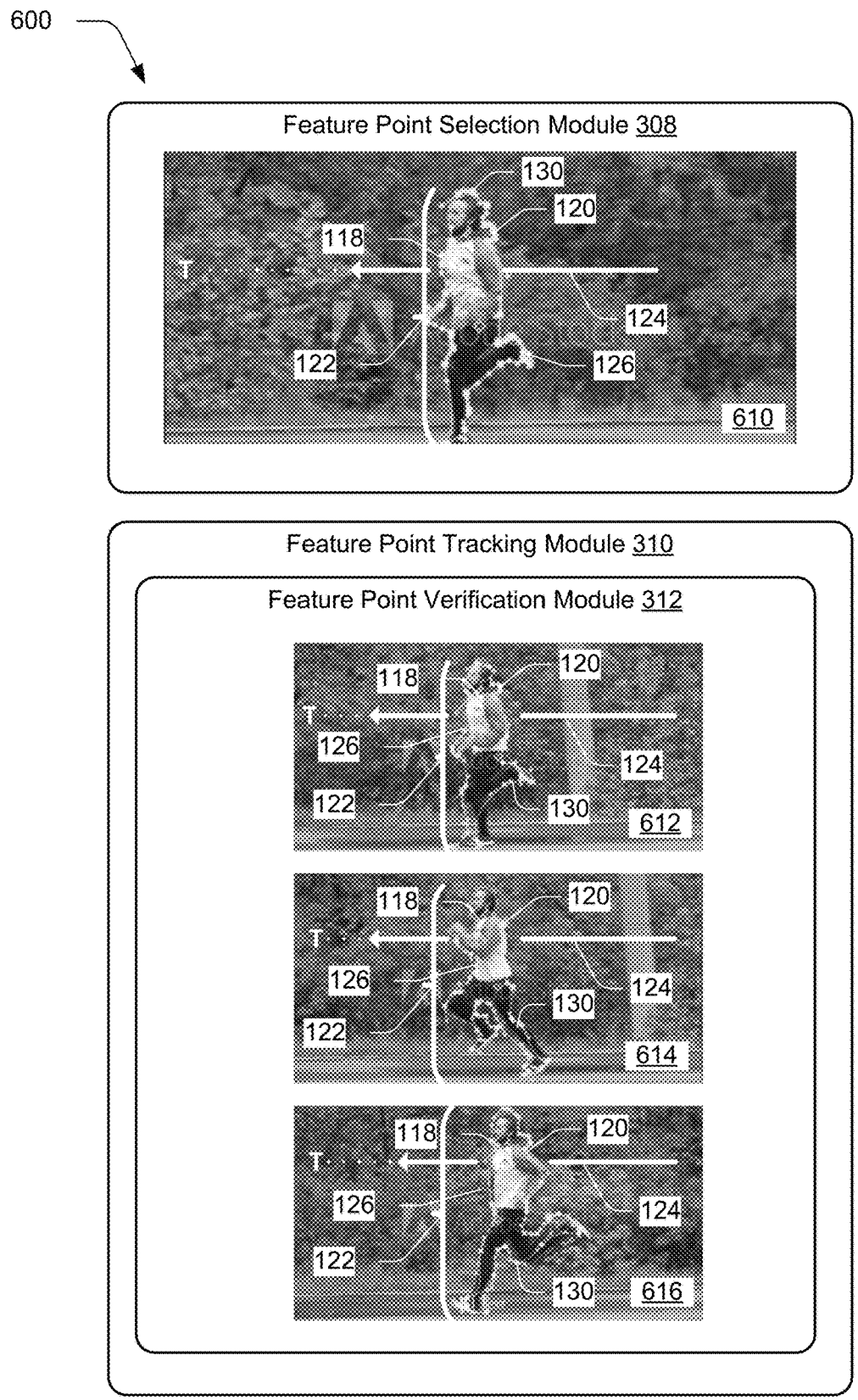
FIG. 6 depicts operation of an example implementation of feature point selection, tracking, and verification modules of the object tracking system to automatically reselect feature points in frames subsequent to an initial frame to track an object in a digital video.

Examples of details of operation of the feature point selection module 308 are shown in FIGS. 5 and 6. In an implementation shown in FIG. 5, the feature point selection module 308 includes a user selection module 502 and an automated object identification module 504. The feature point selection module 308 is in ongoing communication with the feature point verification module 312, showing two example initial frames 506 and 508.

Regarding the user selection module 502, user inputs may be received via a user interface by the module to may manually select the feature points 120 on edge surfaces 126 of the object 118. The user selection module 502, for instance, includes "point-and-click" graphical user interface functionality that is configured to allow a user to interact a peripheral device (e.g., a cursor control device, touchscreen functionality, and so on) to point-and-click on specific pixels on the object 118 within an initial frame, e.g., the initial frames 506 or 508, of the digital video 106. The user inputs are used to manually select a feature point on that pixel or group of pixels. Reference to point-and-click graphical user interface functionality is made herein to various actions of a computer user moving a peripheral device to produce corresponding movement of a cursor to a certain location on a display screen (pointing). The user then presses a button on the peripheral device to select a feature point on that location in the display screen. Next, using such point-and-click functionality, a user may manually connect the feature points 120. Alternatively, the object tracking system 116 may be used to automatically connect the manually selected feature points 120 to extract the object mask 122, e.g., as part of a nearest-neighbor search.

In some instances, manual selection of the feature points 120, using the feature point selection module 308, may be time-consuming and labor intensive. Substantial user effort, for example, may be involved to manually select a multitude of feature points 120 on the edge surfaces 126 of the object 118, which may involve tens and even hundreds of different points to perform accurately. Further, difficulties encountered in manual feature point selection may worsen proportionate to increasing complexity of the object 118 for tracking and thus introduce human error. And, regardless of the complexity of the object 118, the selection of higher quantities of the feature points 120 may, in turn, facilitate higher resolutions of the object mask 122 to better define the object 118 at higher levels of precision.

To address such concerns regarding the user selection module 502, the automated object identification module 504 provides automatic, rapid and accurate selection of high quantities of the feature points 120 to precisely define the object 118. An object of medium complexity, such as the runner shown as object 118 in FIGS. 2, 5 and 6, may require an intermediate level of user effort to manually select the feature points 120. Such parts include, in this example, the runner's head, both arms, both legs, and both feet. Even sophisticated or intricate objects, such as an octopus swimming through the ocean, or moving components of an engine of a racing car, will benefit from the enhanced automatic feature point setting and selection capabilities offered by the automated object identification module 504, which operates to conveniently select a large number of feature points 120.

In some examples, the automated object identification module 504 relies upon active template library (ATL) concepts and functionality to operate. Generally, ATL refers to a set of template-based C++ classes that allow for the creation of small and fast component object model (COM) objects. ATL often includes support for key COM features, including stock implementations, dual interfaces, standard COM enumerator interfaces, tear-off interfaces, and ActiveX controls. ATL functionality, for example, may be used draw shapes such as a circle or a filled polygon.

The automated object identification module 504 may rely on such ATL functionality to select the feature points 120 on the edge surfaces of the object 118 based a variety of factors. Such factors may, for example, include considerations of pixel coloration and intensity between the object 118 and the background, which may be static relative to the moving object 118. Upon consideration of one or more of such factors, the automated object identification module 504 automatically selects the feature points 120 to extract, e.g., create, an object mask 122 tightly bound to the edge surfaces 126 of the object 118 as shown in a frame 508 in FIG. 5, similar to how a sheath contacts and surrounds an object intended for protection, such as a knife.

The feature point selection module 308 accommodates the implementation of both or either of the user selection module 502 and the automated identification module 504. For example, the automated object identification module 504 may add to the feature points 120 already manually selected by a user in the user selection module 502 to, for example, improve adherence of the object mask 122 to the edge surfaces 126 of the object 118. Likewise, users may manually add feature points, by the user selection module 502, to those initially selected by the automated identification module 504. Still further, in some examples, the feature point selection module 308 may require choosing between the user selection module 502 and the automated object identification module 504 to potentially improve upon computational efficiency and performance.

Returning to FIGS. 3 and 4, the feature point tracking module 310 then locates tracked feature points 130 based on the first set of feature points 120 (block 404) at a second frame of the digital video 106. The second frame may be, for example, immediately after the initial frame 110, or may be after a defined interval of intermediate frames, e.g. 5 to 7 frames.

The feature point verification module 312 is then employed to verify whether the tracked feature points 130 of the second frame of the digital video 106 have deviated from the object 118 (block 406). This verification is used to determine whether the tracked feature points 130 of the second frame have deviated from their original earlier positions on the edge surfaces 126 of the object 118 at the initial frame 110. Verification may be performed in a variety of ways. In one example, the feature point verification module 312 determines whether a number of the tracked feature points 130 is within the threshold 314 of a number of the feature points 120.

Detail of operation of the feature point tracking and verification modules 310 and 312, respectively, is shown in FIGS. 5 and 6. In an implementation shown in FIG. 6, the feature point verification module 312 is shown as being incorporated within the feature point tracking module 310, such that both modules 310 and 312 communicate and function interchangeably.

After selection of the feature points 120 by the feature point selection module 308 as detailed above by either manual or automatic selection techniques, the feature point tracking module locates tracked feature points 130 at a second frame, e.g., such as frame 612, which is subsequent to an initial frame 610. The tracked feature points 130 may be a sub-set of the first set of feature points, or may equal the first set of feature points, depending on a selected configuration or implementation of the object tracking system 116.

For example, after selection of the feature points 120 in an initial frame 610, the feature point tracking module 310 tracks the feature points 120 and the object mask 122 in subsequent frames 612-614 of the digital video 106, which are referred to as tracked feature points 130. Verification of tracking is used to determine whether the feature points 120 remain adhered to the edge surfaces 126 of the object 118, or to determine if some feature points have been lost due to deviation. This verification is done, generally, by comparing the number of tracked feature points 130 at a frame after the initial frame 610 to the number of feature points 120 originally selected on the edge surfaces 126 of the object 118 at the initial frame 610.

In detail, the feature point verification module 312 may incorporate Kanade-Lucas-Tomasi (KLT) feature tracker algorithms to track an object, e.g., referred in this example as object "O." Object O is analogous to the object 118 shown the example 600, and elsewhere in the FIGS. Feature points selected in an initial frame are referred to here as "S." The initial frame S is analogous to the initial frame 610 shown in FIG. 6. A count, e.g., the number, of feature points selected in the initial frame is defined as "$F_{N1}$."

Auto-selection of the feature points $F_{N1}$ at the initial frame S using ATL object masking technology automatically defines an object mask for the object O. Techniques are then used to observe and calculate parameters unique to the object O, e.g., such parameters including or relying upon usage of semantic, e.g., color and facial recognition technology for enhanced object detection.

In addition, the techniques described herein also facilitate the selection and tracking of multiple objects in a digital video by applying one or more tags to each object for effective differentiation of the tagged object from other objects, which may or may not be tagged. Such tags are referred to as "T" in this example. Parameters and tags representative of specific objects in the initial frame S are denoted as $P_1$ and $T_1$, respectively. Further, in some examples, the techniques draw an encompassing region referred to as a "rect" over sections of frames where O resides using machine-learning auto-tagging technology. Such definition of rects assists in the definition or assignment of the tags T to their respective objects O.

As generally introduced and discussed earlier, the techniques described herein locate and verify feature points iteratively, on a frame-by-frame basis, or upon a defined interval of intermediate frames. The number of feature points still adhered to edge surfaces of O on a current frame, referred to as "t," is calculated as $F_t$. Techniques then determine, e.g., calculate, if the absolute value of the number of feature points, e.g., including those still adhered to edge surfaces of O, is lesser than the feature points in the immediately previous frame, referred to as "t–1", by a pre-defined margin or threshold, $Delta_1$. This relationship is shown in the form of an equation as follows: e.g., $|F_t - F_{t-1}| > Delta_1$.

Relating this example to that discussed for FIG. 6, as well as FIGS. 3 and 4, $F_t$ corresponds to the tracked feature points 130 at a current frame (frame 614). $F_{t-1}$, likewise, refers to the feature points 120 at the immediately preceding frame (frame 612). The absolute value of the difference in the number of tracked feature points 130 to the number of the feature points 120 in the immediately preceding frame is then compared against a threshold, e.g., the threshold 314 of FIG. 3 or $Delta_1$ of this example.

For instance, a condition where $|F_t - F_{t-1}| > Delta_1$ indicates that the absolute value of the difference of the number of feature points in the current frame t and the immediately preceding frame t–1 exceeds a pre-defined margin or threshold, $Delta_1$, indicating that a number of feature points have been lost or misplaced from O due to drift. Such a condition results in the feature point verification module 312 communicating with the feature point selection module to reselect the feature points 120 on edge surfaces 126 of a current frame being verified, e.g., any frame subsequent to the initial frame 610. This iterative verification and subsequent reselection of the feature points 120 based on this verification is shown on a frame-by-frame basis in frames 612-614 of FIG. 6. Feature points may be reselected in closer proximity to edge surfaces 126 of the object 118 in frames subsequent to the initial frame 610. Accordingly, the object mask 122 extracted from the reselected feature points 120 remains firmly adhered to the edge surfaces 126 of the object 118 throughout the digital video 106.

Although described above as an iterative, e.g., frame-by-frame, feature point reselection process, the feature point verification and selection modules 312 and 308, respectively, may be configured to conduct the described assessment against a threshold upon any number of intermediate frames, e.g., upon an interval of 5 to 7 frames. Alternatively, the number of the feature points 120 at the initial frame 610, rather than any frame preceding a current frame, may be subtracted from the tracked feature points 130 at a current frame to calculate the absolute value for comparison against the threshold $Delta_1$.

Also, $Delta_1$ is a configurable parameter, and may be defined to reflect the particular tolerance demands of individual digital video scenarios. For instance, tracking a running human being as shown in the example 600 may use a pre-defined threshold of 20%. That is, the tracked feature points 130 of a current frame must be 20% lower than the feature points 120 in an immediately previous frame, a frame preceding the current frame by a defined interval, or the initial frame. For example, the number of tracked feature points 130 in a current frame (frame 614) would have to be 80 or less if the immediately preceding frame (frame 612) has 100 feature points to trigger reselection of feature points in subsequent frames 616 to maintain adherence of the object mask 122 to edge surfaces 126 of the object 118.

In contrast to this example of a runner, tracking a running cheetah in the wild may require a tighter threshold, e.g., <5%, due to the higher running speed of the cheetah, to maintain accurate and precise positioning of the object mask 122 on the cheetah. In such a scenario, feature points are reselected at a faster pace and at a higher number.

The described techniques, performed by the feature point selection, tracking and verification modules 308, 310 and 312, respectively, of the object tracking system 116 provide for reselection of feature points proportionate to the difference between those detected at the current frame t and the frame immediately previous to the current frame t–1, or any earlier frame, or the initial frame S. For instance, in some examples, a large difference between tracked feature points located or detected at the current frame compared to those located or detected earlier will cause many feature points to be reselected on edge surfaces of the object O. In contrast, a smaller difference may involve a lesser quantity of feature points to be selected or reselected.

The described techniques may also incorporate detection of one or more objects O for tracking on the matching of parameters $P_t$ and tags $T_t$ on the current frame t with parameters $P_s$ and tags $T_s$ set earlier in the initial frame S. Thus, the identity of object detected at the current frame, e.g., referred to herein as "$O_t$," is additionally verified against the identity of the object originally in the initial frame S as "$O_s$." Tagged objects O are also differentiated from other objects, tagged or non-tagged, regardless of proximity to the other objects, relative to that set in the initial frame S. For instance, a tagged object $O_s$ that is near to a non-tagged object may still be accurately defined and edited in scenes after the initial frame S using the inventive techniques.

Such tagging of multiple objects for differentiation between the tagged objects and other objects, tagged or not-tagged, is shown in FIG. 8. For instance, example 800 has an object identification module 802 that incorporates a machine learning module 804, which has object data 806, parameters 808, and tags 810. As described, each of the object data 806, the parameters 808, and the tags 810 are object-specific. That is, the object data 806 pertains to each individual object, e.g., such a first object 812 shown in a frame 816. Separate object data distinct from the object data 806 may be associated with a second object 814 in the frame 816. Likewise, individual parameters regarding facial features, skin coloration, clothing, hue, color saturation, or other visual graphic editing related parameters are associated with individual objects according to their respective tags.

For example, the parameters 808 are associated with the first object 812. Parameters different from the parameters 808 are associated with the second object 816, and so on and so forth for additional objects. Association of the object data 806 and the parameters 808 with specific objects permits for the accurate placement of tags 810 that are object-specific. A first tag (of the tags 810) is applied to the first object 812, and a second tag (of the tags 810) is applied to the second object 816. The machine learning module 804 communicates with the object identification module 802 to, if necessary, apply the inventive techniques related to feature point reselection on an object-by-object basis to accurately edit individual objects in the scene.

As shown in FIG. 8, the machine learning module 804 considers the object data 806, the parameters 808, and the tags 810 for the object identification module 802 to correctly identify each of the first and second objects 812 and 814, respectively, in the scene shown in frame 816. If desired, both objects 812 and 814 may be deleted from the scene to produce modified frame 818 as shown in FIG. 8. However, other editing is also possible, such as the relocation of identified objects within a scene, if desired, as well as ongoing feature point tracking.

Overall, the ongoing verification and controlled reselection of the feature points 120, such that the feature point count at a current frame, e.g., any of the frames 612-614 shown in FIG. 6, matches the initial frame 610, improves object motion tracking accuracy and precision and may be integrated with the multiple object tagging and tracking capabilities shown in FIG. 8 and discussed above. Such application of object-tagging ensures correct differentiation between multiple tracked objects in a single, or common, digital video.

Usage of machine learning based techniques, including deep learning, for the auto-selection of feature points to tightly define an object mask on the edge surfaces of a moving object provides for the reduction in an amount of time taken to track the object up-to $1/10$th in comparison to conventional techniques. That is, the techniques described herein can motion-track the object up-to ten times faster than conventional techniques, as well as improving object tracking accuracy and precision. Further, the techniques described herein may eliminate a conventional requirement of manual user intervention to initially select feature points using the auto-selection capabilities described above. Such automatic methods also reduce the effort previously required to perform manual feature point selection, reducing, for example, user fatigue.

Returning to FIGS. 3 and 4, responsive to verifying that the tracked feature points 130 have deviated, a second set of feature points is selected from the second frame of the digital video (block 408). This verification, for instance, may be based on a determination that the number of the tracked feature points 130 is not within the threshold 314. In response, the feature point verification module 312 initiates the feature point selection module 308 to reselect the feature points 120, e.g., on the edge surfaces 126 of the object 118 for the second frame of the digital video 106. The reselected set of the feature points 120 may thus be referred to as a second set of feature points.

The object is then tracked in the digital video (e.g., for one or more subsequent frames) based on the second set of feature points (block 410). Upon reselection of the feature points 120, for instance, the object tracking system automatically initiates the feature point tracking module 310 to track the object 118 according to the reselected feature points 120 in the digital video 106.

Figure 7:
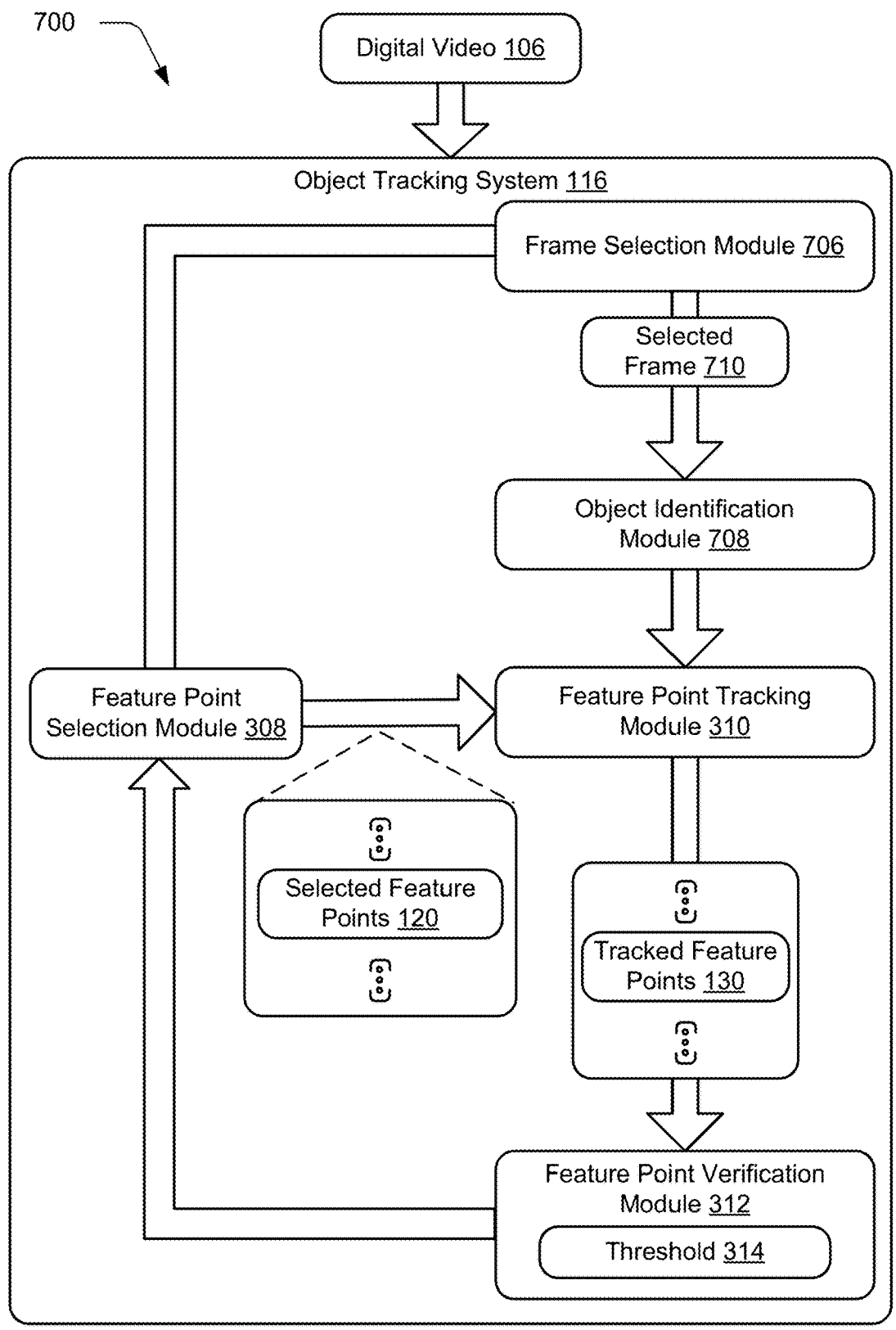
FIG. 7 depicts an example implementation of the system of FIG. 3 having an object identification module to track multiple objects in a digital video.

Another implementation of the example 300 shown in FIG. 3 is shown as example 700 shown in FIG. 7. Example 700 incorporates a number of modules and features previously presented and discussed for example 300, e.g., the feature point selection, tracking and verification modules 308, 310, and 312, respectively, thus a redundant description of the same is omitted.

In addition to that shown in example 300, example 700 includes a frame selection module 702 that selects a selected frame 710 that is subsequent to the initial frame 110, e.g., as shown in FIG. 1. The object tracking system 116, as shown in the implementation of example 700, then employs an object identification module that performs the auto-tagging functionality detailed for multiple objects as shown in FIG. 8. Thus, the feature point selection, tracking and verification modules 308, 310, and 312, respectively, may be configured according to example 700 to track multiple objects simultaneously in the digital video 106 according to the respective tag placed on each object.

In this way, the object tracking verification techniques described herein overcome the challenges and limitations of conventional techniques by automatically selecting, tracking, and verifying the tracking of an object without manual user intervention. As discussed above, the object tracking system 116 provides advantages to address the challenges of conventional techniques in that: (1) feature points are automatically selected without manual user intervention in the initial frame 110, and (2) automatic verification and reselection of the feature points 120 retains the object mask 122 around the object 118 during movement of the object 118 between frames 128 automatically and without user intervention.

Such capabilities facilitate ongoing object tracking accuracy, while also minimizing potential errors due to feature point deviation. As a result of implementing the object tracking system 116, the tedious and repetitive selection of feature points to define a shape, such as the object mask 122, around the object 118 to be tracked in the initial frame 110 as needed in conventional techniques, may be avoided. As a result, the object tracking system 116 enhances both object tracking efficiency and accuracy in comparison to conventional techniques.

Also, retaining the object mask 122 as adhered on the moving object 118 across multiple frames 128 of the digital video 106 permits the described techniques to accurately delineate the work path 124 of the object mask 122. As discussed, the work path 124 defines a general path of movement of the object, and use of the work path by the object tracking system 116 results in improvement of object tracking accuracy.

Techniques are also described to calculate parameters and tags specific to the object to be tracked, e.g., as described earlier and shown in FIG. 8. Thus, multiple objects may be simultaneously tracked in the digital video by applying object-specific tags to each of the objects.

Further, techniques calculate and use visual representation of an encompassing rectangular function or region, referred as a "rect," over sections of the frames 128 where the object 118 to be tracked resides. In instances where multiple objects are tracked, multiple rects may be generated, where the one or more rects assists the automatic tagging of objects residing within their respective rects.

Moreover, techniques may iterate, on a frame-by-frame basis, to verify the number of feature points 120 across various frames. In some examples, such verification extends to and considers whether the feature points 120 are still adhered to the edge surfaces 126 of the tracked object 118.

Such verifications are used to determine when and where select or reselect additional feature points to maintain the positional accuracy of the object mask 122 as adhered onto the object 118 during movement of the object 118.

The techniques, and the various aspects of individual techniques described above, are interchangeable and may communicate or function with any one or more of the described techniques. For instance, the described feature point selection capabilities may complement identification of the work path. And, the feature point regeneration capabilities and the identification of the work path may function with the discussed multiple object tagging capabilities within a given frame, or sequence of frames, in a digital video. Thus, the techniques collectively provide an accurate, thorough and powerful approach to seamless object tracking in digital video, while requiring minimal ongoing user intervention.

Example System and Device

Figure 9:
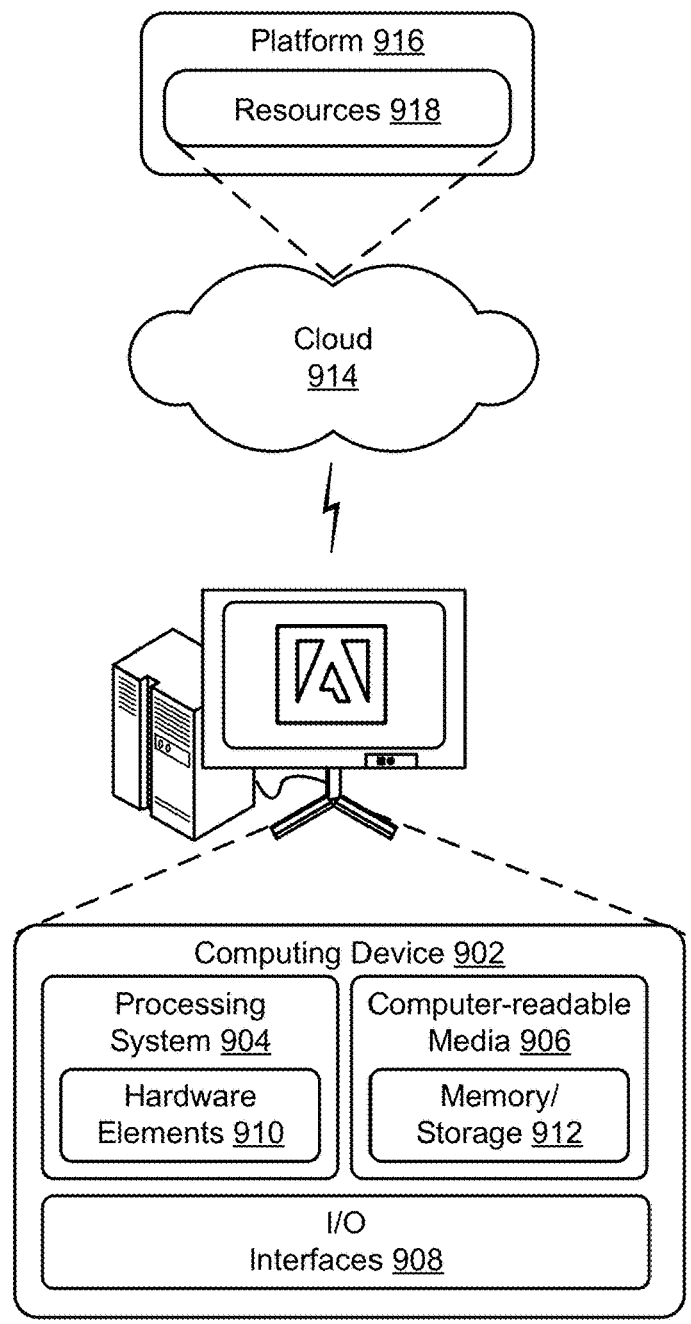
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the object tracking system 116. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium object tracking verification environment, a method implemented by at least one computing device, the method comprising:
    calculating, by the at least one computing device, parameters for an object using facial recognition technology for tracking the object in the digital video;
    selecting, by the at least one computing device, a first set of feature points from a first frame of a digital video as corresponding to the object, the first set of feature points selected in accordance with the parameters as differentiating the object from an additional object;
    locating, by the at least one computing device, tracked feature points from a second frame of the digital video based on the selected first set of feature points;
    verifying, by the at least one computing device, whether the tracked feature points of the second frame of the digital video have deviated from the object;
    responsive to verifying that the tracked feature points have deviated, selecting a second set of feature points from the second frame of the digital video by the at least one computing device, the second set of feature points selected automatically and without user intervention using machine learning; and
    tracking, by the at least one computing device, the object in the digital video based on the second set of feature points.

2. The method as described in claim 1, further comprising tagging the object with a tag in the first frame, the first set of feature points selected according to the tag as differentiating the object from the additional object.

3. The method as described in claim 2, wherein the tagging is performed automatically.

4. The method as described in claim 1, further comprising:
    defining a rectangular region in the first frame of the digital video for tagging of the object and the additional object within the rectangular region; and
    selecting a set of feature points from the first frame as corresponding to the additional object.

5. The method as described in claim 1, further comprising obtaining an object mask around the object from the first frame using auto-selection, the second set of feature points selected based on the object mask.

6. The method as described in claim 1, wherein the first set of feature points is selected based on a contour, edge, or surface of the object.

7. The method as described in claim 1, wherein the second set of feature points is in closer proximity with the object in comparison to the tracked feature points.

8. The method as described in claim 1, wherein the verifying includes determining whether a number of the tracked feature points is within a threshold of a number of the first set of feature points.

9. The method as described in claim 1, wherein the tracking is based on a Kanade-Lucas-Tomasi (KLT) feature tracking technique.

10. One or more non-transitory computer-readable storage media comprising instructions stored thereon that, responsive to execution by a computing device in a digital medium object tracking verification environment, cause operations of the computing device including:

calculating parameters for an object using facial recognition technology for tracking the object in the digital video;

selecting a first set of feature points from a first frame of a digital video as corresponding to the object, the first set of feature points selected in accordance with the parameters as differentiating the object from an additional object;

locating tracked feature points from a second frame of the digital video based on the selected first set of feature points;

verifying whether the tracked feature points of the second frame of the digital video have deviated from the object;

responsive to verifying that the tracked feature points have deviated, selecting a second set of feature points from the second frame of the digital video, the second set of feature points selected automatically and without user intervention using machine learning; and tracking the object in the digital video based on the second set of feature points.

11. The one or more non-transitory computer-readable storage media as described in claim 10, wherein the tracking is based on a Kanade-Lucas-Tomasi (KLT) feature tracking technique.

12. The one or more non-transitory computer-readable storage media as described in claim 10, the operations further including tagging the object with a tag in the first frame, the first set of feature points selected according to the tag as differentiating the object from the additional object.

13. The one or more non-transitory computer-readable storage media as described in claim 12, wherein the tagging is performed automatically.

14. The one or more non-transitory computer-readable storage media as described in claim 10, the operations further including obtaining an object mask around the object from the first frame using auto-selection, the second set of feature points selected based on the object mask.

15. The one or more non-transitory computer-readable storage media as described in claim 10, the operations further including determining whether a number of the tracked feature points is within a threshold of a number of the first set of feature points.

16. The one or more non-transitory computer-readable storage media as described in claim 10, wherein the second set of feature points is closer in proximity with the object in comparison to the tracked feature points.

17. In a digital medium object tracking verification environment, a system comprising:

an object tracking module implemented at least partially in hardware of a computing device to:

calculate parameters for an object using facial recognition technology for tracking the object in a digital video;

select a first set of feature points from a first frame of the digital video as corresponding to the object, the first set of feature points selected in accordance with the parameters as differentiating the object from an additional object;

locate tracked feature points from a second frame of the digital video based on the selected first set of feature points;

verify whether the tracked feature points of the second frame of the digital video have deviated from the object;

responsive to verifying that the tracked feature points have deviated, select a second set of feature points from the second frame of the digital video, the second set of feature points selected automatically and without user intervention using machine learning; and track the object in the digital video based on the second set of feature points.

18. The system as described in claim 17, wherein the object tracking module is further implemented to tag the object with a tag in the first frame, the first set of feature points selected according to the tag as differentiating the object from the additional object.

19. The system as described in claim 17, wherein the object tracking module is further implemented to obtain an object mask around the object from the first frame using auto-selection, the second set of feature points selected based on the object mask.

20. The system as described in claim 17, wherein the tracking is based on a Kanade-Lucas-Tomasi (KLT) feature tracking technique.

* * * * *